United States Patent
Dragne et al.

(10) Patent No.: US 8,934,833 B2
(45) Date of Patent: Jan. 13, 2015

(54) AUTOMATIC DETECTION OF COMMUNICATIONS SATELLITE

(75) Inventors: Lucian Dragne, Dublin (IE); Rathe Hollingum, Dublin (IE); Gunther Logemann, Dublin (IE); Lorcan Mooney, Sligo (IE)

(73) Assignee: Microsoft Corporation, Redmond, WA (US)

( * ) Notice: Subject to any disclaimer, the term of this patent is extended or adjusted under 35 U.S.C. 154(b) by 1804 days.

(21) Appl. No.: 11/809,755

(22) Filed: Jun. 1, 2007

(65) Prior Publication Data

US 2008/0297406 A1    Dec. 4, 2008

(51) Int. Cl.
*H04H 20/74*    (2008.01)
*H04B 1/00*    (2006.01)
(Continued)

(52) U.S. Cl.
CPC .................................. *H04B 7/185* (2013.01)
USPC ...... 455/3.02; 455/63.1; 455/67.11; 455/135; 370/328; 370/343; 375/316; 375/344; 725/63; 725/68; 725/70

(58) Field of Classification Search
CPC .......... H04B 7/185; H04B 1/18; H04B 1/525; H04B 7/082; H04B 7/0817; H04B 7/18582; H04B 7/18508; H04B 7/18584; H04B 7/2041; H04B 17/0042; H01Q 3/00; H04H 20/74; H04H 40/90; H04N 7/20; H04N 21/6143; H04N 21/6422; H04L 63/08; H04L 63/102; H04W 80/04; H04W 88/05; H04W 88/08; H04W 16/14; H04W 24/00
USPC ........... 455/3.01, 3.02, 3.03, 3.04, 3.05, 3.06, 455/12.1, 13.2, 63.1, 63.4, 132, 133, 134, 455/135; 342/352, 357.25, 357.42, 357.44, 342/357.76, 359, 372, 464, 174; 343/757, 343/781 R, 911 L; 370/328, 343; 701/215, 701/470; 725/47, 49, 68, 69, 70, 71, 72
See application file for complete search history.

(56) References Cited

U.S. PATENT DOCUMENTS 4,907,003 A * 3/1990 Marshall et al. .............. 342/352
5,579,367 A * 11/1996 Raymond et al. ............. 455/418
(Continued)

OTHER PUBLICATIONS

Katsumata, et al., "A Digital Satellite Receiver with an Advanced User Friendly Interface", Date: 1997.
(Continued)

*Primary Examiner* — Yuwen Pan
*Assistant Examiner* — Paul P Tran
(74) *Attorney, Agent, or Firm* — Micah Goldsmith; Leonard Smith; Micky Minhas

(57) ABSTRACT

A fast and efficient automated satellite constellation detection process can be implemented at least in part independent of in-band data in the satellite signal. The automated detection process iterates through a set of various predefined transponder settings to detect one or more accessible satellite constellations through each satellite dish connected directly or through a switch to a satellite receiver. The process determines whether the satellite receiver is able to lock onto a satellite signal at each transponder setting. Based on the combinations of which satellite constellations are available at each transponder setting, the process allocates a specific satellite constellation to each satellite dish. In one implementation, channel information can be used to further refine the detection and identification of accessible satellite constellations for each satellite dish.

16 Claims, 6 Drawing Sheets

(51) Int. Cl.
*H04B 15/00* (2006.01)
*H04W 4/00* (2009.01)
*H04J 1/00* (2006.01)
*H03K 9/00* (2006.01)
*H04L 27/00* (2006.01)
*H04N 7/20* (2006.01)
*H04B 7/185* (2006.01)

(56) References Cited

U.S. PATENT DOCUMENTS

| | | | | |
|---|---|---|---|---|
| 5,585,804 A * | 12/1996 | Rodeffer | ................ | 342/359 |
| 5,913,151 A * | 6/1999 | Lusignan | ................ | 455/3.01 |
| 5,940,737 A * | 8/1999 | Eastman | ................ | 725/68 |
| 6,175,723 B1 * | 1/2001 | Rothwell, III | ................ | 455/63.1 |
| 6,693,587 B1 * | 2/2004 | Kuether et al. | ................ | 342/359 |
| 6,980,529 B1 * | 12/2005 | Arsenault | ................ | 370/316 |
| 7,085,529 B1 * | 8/2006 | Arsenault et al. | ................ | 455/3.02 |
| 7,203,457 B1 * | 4/2007 | Wetzel | ................ | 455/3.02 |
| 7,230,569 B1 * | 6/2007 | Hules et al. | ................ | 342/359 |
| 7,376,387 B1 * | 5/2008 | Eck | ................ | 455/3.06 |
| 7,890,981 B2 * | 2/2011 | Quere et al. | ................ | 725/69 |
| 2002/0003492 A1 * | 1/2002 | Syrjarinne et al. | ........ | 342/357.06 |
| 2002/0158797 A1 * | 10/2002 | Kelly et al. | ................ | 342/359 |
| 2006/0253877 A1 * | 11/2006 | Hsu | ................ | 725/68 |
| 2007/0080860 A1 * | 4/2007 | Norin | ................ | 342/359 |
| 2007/0294731 A1 * | 12/2007 | Arsenault et al. | ................ | 725/70 |

OTHER PUBLICATIONS

Noda, et al., "A Front-End for a Digital Satellite TV Broadcasting Receiver", IEEE Transactions on Consumer Electronics, vol. 40, Issue, 3, Aug. 1994.

* cited by examiner

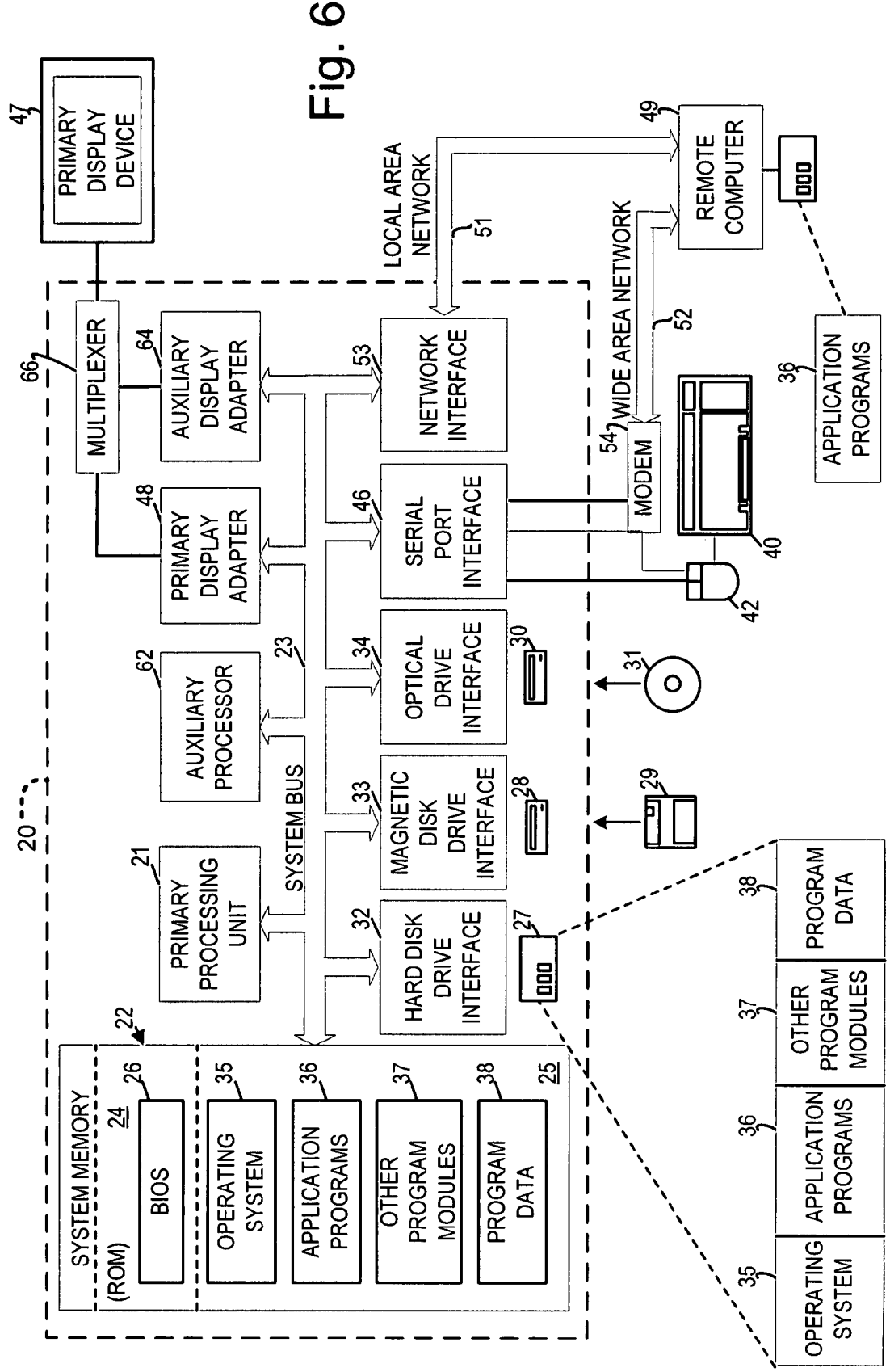

AUTOMATIC DETECTION OF COMMUNICATIONS SATELLITE

BACKGROUND

Setting up and activating service of certain satellite communications services (e.g., satellite television service, etc.) can be a complicated process for a consumer. When the consumer sets up a satellite television system, for example, the consumer (or an installer) installs one or more satellite dishes to point toward predetermined locations in the sky and strings signal cables from the satellite dish to an integrated receiver decoder (IRD) (also referred to as a satellite receiver), which controls the communications through the satellite dish. The predetermined locations may be identified from publicly available information that specifies the sky locations of appropriate satellite constellations providing communications signals accessible through the satellite dishes. Satellite finder devices may also be used to aim the satellite dishes toward the appropriate sky locations. It should be understood that a satellite receiver may be connected to multiple dishes through a switch, for example a DiSEqC (Digital Satellite Equipment Control) switch that can switch among signals received by multiple satellite dishes.

However, the consumer (or an installer) must then configure the satellite receiver to establish communications with the satellite constellation toward which the dish is aimed. Existing approaches require that the user manually enters the identity and modulation parameters of the satellite constellation or to execute a lengthy automated configuration process in which the satellite receiver processes in-band data from satellite signals to identify the target satellite constellation. Unfortunately, the manual process is complicated and frustrating for many consumers and the existing automated configuration processes that employ evaluation of in-band information demonstrate detection times ranging up to tens of hours per satellite constellation.

SUMMARY

Implementations described and claimed herein address the foregoing problems by providing a fast and efficient automated satellite constellation detection process that can be independent of in-band data in the satellite signal. The automated detection process iterates through a set of various predefined transponder settings to detect one or more accessible satellite constellations through each satellite dish connected through a switch to a satellite receiver. The process determines whether the satellite receiver is able to lock onto a satellite signal at each transponder setting. Based on the combinations of which satellite constellations are available at each transponder setting, the process allocates a specific satellite constellation to each satellite dish. In one implementation, channel information can be used to further refine the detection and identification of accessible satellite constellations for each satellite dish.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 6 illustrates an example system that may be useful in implementing the described technology.

DETAILED DESCRIPTIONS

Figure 1:
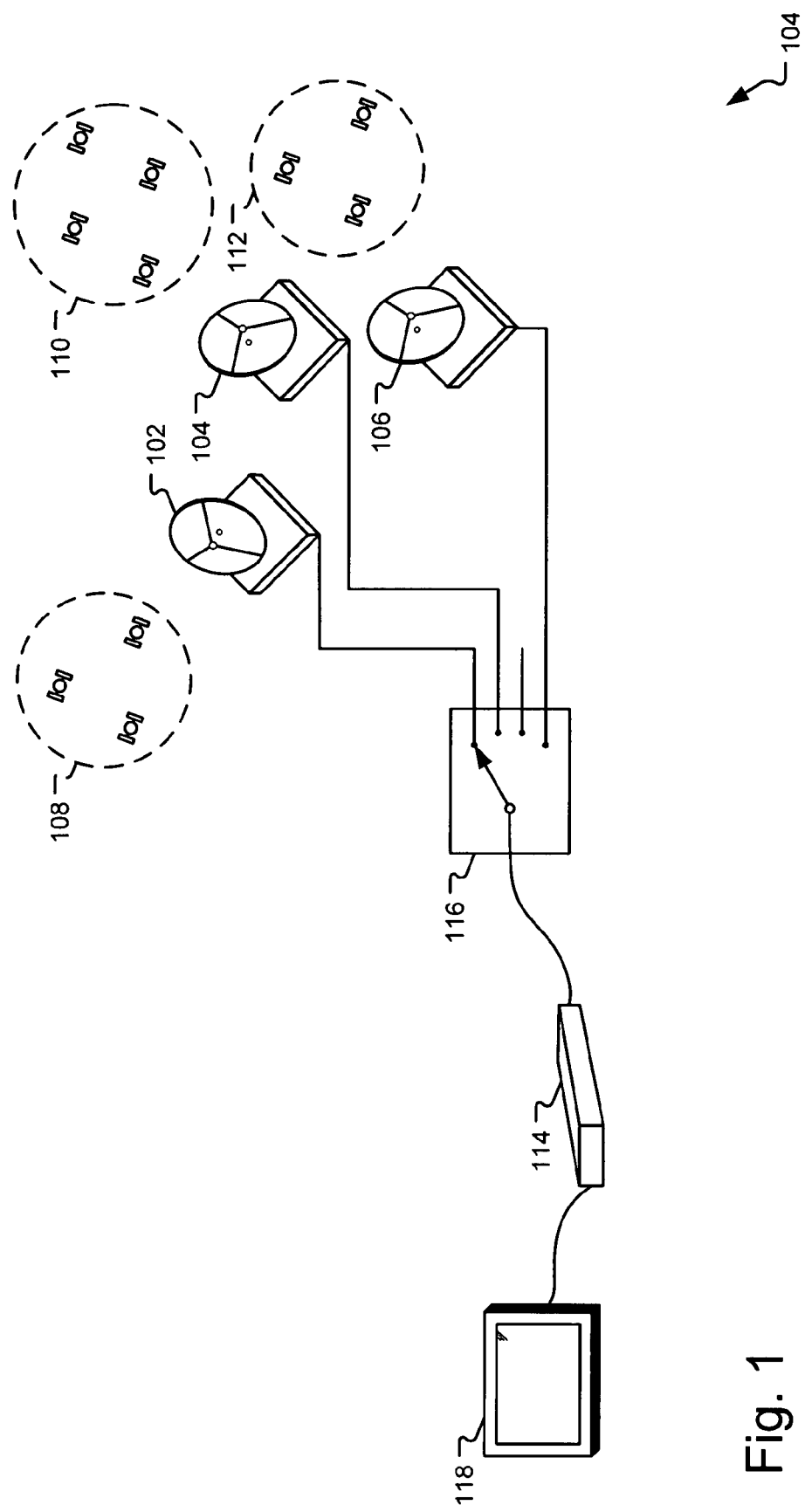
FIG. 1 illustrates an example satellite communications system.

FIG. 1 illustrates an example satellite communications system 100. In the illustration, three satellite dishes 102, 104, and 106 are ostensibly aimed at three different satellite constellations 108, 110, and 112. It should be understood that a satellite constellation may refer to one or many satellites that occupy a close proximity such that a single non-steerable satellite dish can receive at least one of the satellites. The satellite dishes 102, 104, and 106 are connected to a satellite receiver 114, such as a personal computer, set-top box, or gaming console, through a selector switch 116, although no such switch is required. In one implementation, the selector switch 116 may represent a DiSEqC switch, although other types of switches may be employed. The satellite receiver 114 includes a tuner and is capable of decoding the communications signals received from the satellite constellations 108, 110, and 112 and presenting them on an output device 118, such a television monitor, a computer monitor, a set of one or more audio speakers, etc. In one implementation, the satellite receiver 114 can control the selector switch 116 to select among the individual satellite dishes 102, 104, and 106.

When a user sets up a satellite receiver, one of the steps implemented in the set up procedure is to aim (or attempt to aim) the satellite dish in the direction of a satellite constellation transmitting the desired communications signal. In one example, a consumer may have just purchased a satellite receiver and satellite dish. The consumer (or an installer) sets up the satellite dish in a location (e.g., on the roof of the home, etc.) and aims it in the anticipated direction of a desired satellite constellation. In another example, the consumer may have moved to a different location, thereby requiring redirection of his or her satellite dish and perhaps altering his or her choice of available satellite constellations. The consumer therefore needs to adjust the dish's aim based on the new location or even to aim at a different satellite constellation in order to obtain the desired communications signal.

Each satellite dish 102, 104, and 106 receives the communications signals emanating from one or more of the satellites in the constellation. The communications signal from a satellite may be encoded. For example, a digital television signal may be encoded in an MPEG2 transport stream. Other types of communication signals (e.g., signals used in digital radio, internet data communications services, etc.) may also use MPEG2 or other encoding formats.

The communication signals are modulated according to defined modulation parameters. In the case of digital satellite television signals, for example, modulation parameters may include without limitation frequency, polarity, and symbol rate and may include a tolerance range (e.g., in the frequency value) to account for externalities, such as calibration problems, environmental effects, electronic variances, etc. Some modulation parameter sets may be unique to a particular satellite constellation, whereas other modulation parameters sets may be shared by more than one satellite constellation. Modulation parameter sets for various satellite constellations may be obtained from various sources. See e.g., http://www-.satcodex.com, which (for various satellite constellations) defines, in addition to the modulation parameters, other parameters such as: frame rate, video format, channel, aspect ratio, number of pixels video bit rate, transmission mode (e.g., MPEG2), encryption mode, the number of forward error correction bytes, video program identification, audio program identification, program clock reference, virtual channel number, service identification, transponder identification, network identification, etc.

By testing one or more modulation parameter sets, the satellite receiver 114 can identify a satellite constellation from which an individual satellite dish is receiving communication signals. The satellite receiver 114 can also control the selector switch 116 to select among communication connections to the multiple satellite dishes 102, 104, and 106. Accordingly, the satellite receiver 114, which may be embodied by various computing devices and systems (including a set-top box, a media management computer, a special purpose satellite receiver device, a satellite finder/detector, etc.), can perform automated detection and identification of satellite constellations to which connected satellite dishes are directed.

Figure 2:
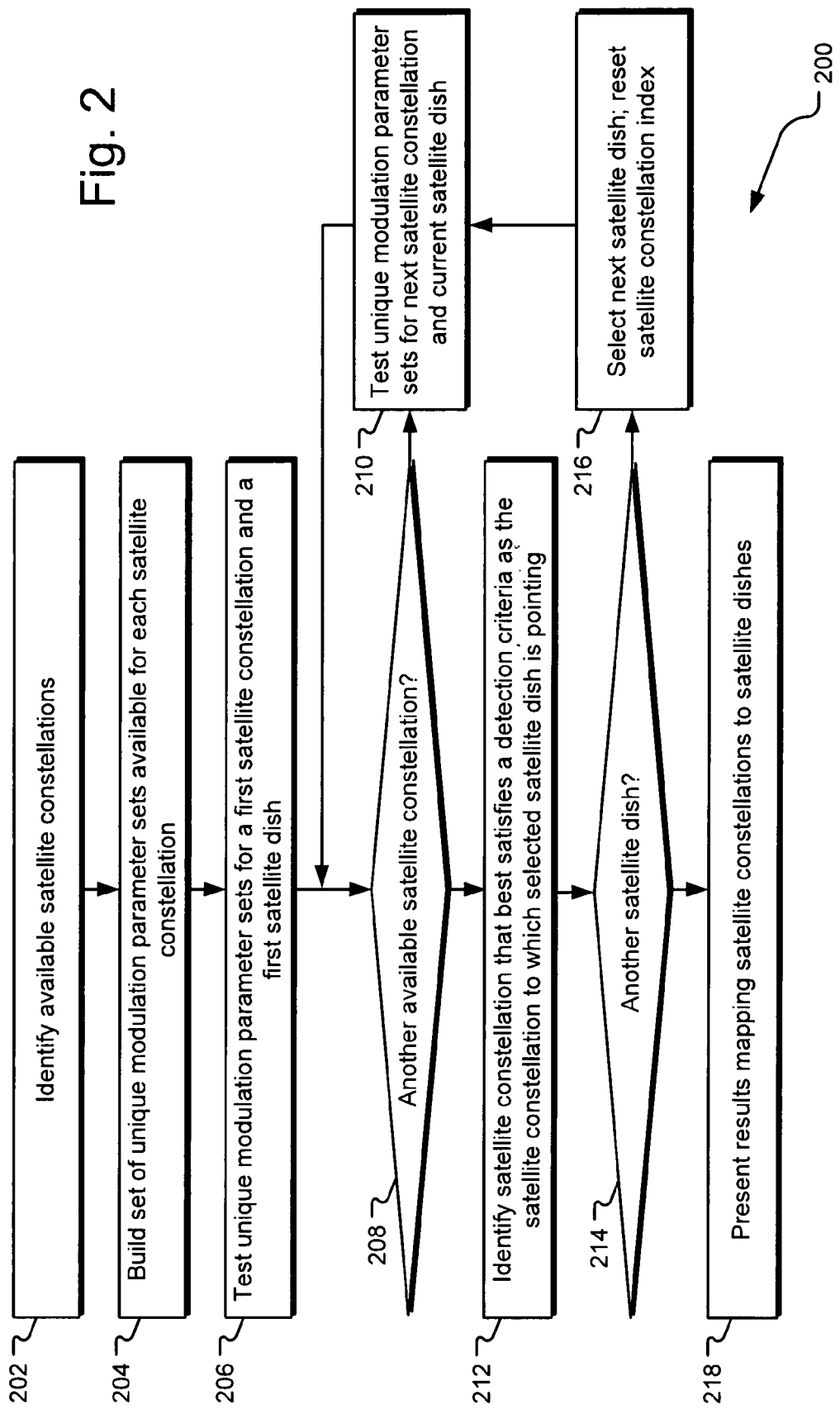
FIG. 2 illustrates example operations for detecting a satellite constellation.

FIG. 2 illustrates example operations 200 for detecting a satellite constellation. An identification operation 202 identifies available satellite constellations and their possible modulation parameters. In one implementation, the identification operation 202 accesses one or more datastore (local or remote) of known satellite constellations and their possible modulation parameters and narrows these results down according to geographical location and/or other known parameters (e.g., "visible" portion of the sky for each connected satellite dish, payment requirements, etc.). However, the identification operation 202 may alternatively refrain from narrowing these results.

A building operation 204 builds a set of modulation parameter sets that are unique for any satellite constellation. For example, some modulation parameter sets may be shared by more than one satellite constellation. Such a shared modulation parameter set is termed "non-unique", whereas a modulation parameter set designated for only one satellite constellation in the set of identified satellite constellations is termed "unique". The building operation 204 associates each satellite constellation with its one or more unique modulation parameter sets.

A testing operation 206 selects a connected satellite dish (e.g., via a selector switch connected to multiple satellite dishes), tunes to a modulation parameter set associated with a first satellite constellation from the set of identified satellite constellations, and determines whether a communications signal from a satellite constellation is received or "locked onto" by the tuner. The testing operation 206 repeats for each modulation parameter set associated with the first satellite constellation, or at least a defined subset of these modulation parameter sets. The results of the testing operation 206 are stored in memory for evaluation against one or more detection criteria.

A decision operation 208 determines whether another identified satellite constellation is may be available to the satellite receiver. If so, another testing operation 210 indexes to the next satellite constellation in the set of identified satellite constellations and tests the one or more modulation parameter sets associated with the next satellite constellation, in a manner similar to the testing operation 206. The combination of decision operation 208 and testing operation 210 iterates through the set of identified satellite constellations to collect test results for each satellite constellation and its set of unique modulation parameters. The results of the testing operation 210 are stored in memory for evaluation against one or more detection criteria.

An identification operation 212 evaluates the testing results stored in memory against one or more detection criteria. Various criteria may be employed (individually or in combination), including the following examples:

Threshold: Set a threshold number of successful modulation parameter sets. If the number of successful attempts to lock onto a satellite constellation with its individual modulation parameters sets reaches the threshold number, then the selected satellite dish is deemed to point at that satellite constellation.

Majority: If the number of successful attempts to lock onto a satellite constellation with its individual modulation parameters sets reaches more than half of the modulation parameter sets associated with the tested satellite constellation, then the selected satellite dish is deemed to point at that satellite constellation.

Percentage: If the number of successful attempts to lock onto a satellite constellation with its individual modulation parameters sets reaches a specified percentage of the modulation parameter sets associated with the tested satellite constellation, then the selected satellite dish is deemed to point at that satellite constellation.

Unitary: If at least one modulation parameter set associated with a satellite constellation successfully locks onto a satellite constellation, then the selected satellite dish is deemed to point at that satellite constellation.

Maximum: The selected satellite dish is deemed to point at the satellite constellation having the most successful lock attempts using its individual modulation parameter sets.

A decision operation 214 determine whether another satellite dish may be available for testing, such as via a selector switch. If so, a selector operation 216 selects the next satellite dish or the next connection on the selector switch, and the satellite constellation index is reset to the first identified satellite constellation. Then, processing proceeds to the testing operation 210. If not, then all satellite dishes have been tested against all identified satellite constellations, and a presentation operation 218 presents the results for use by the satellite receiver and/or a user/installer. For example, a mapping between satellite dishes (or selector switch settings) and satellite constellations may be displayed to a user via a television monitor or other display. Alternatively, the mapping results may be printed out or audibly output to a user or communicated (e.g., via email, serial cable, etc.) to a media controller that stores the results in memory for use by the satellite receiver.

It should be noted that the mapping results may present a null mapping for a given satellite dish. Such a result may arise if a selector switch connection is not connected to a satellite dish, if no satellite constellation is present in the connected satellite's "visible" portion of the sky, if a portion of the satellite communications system is malfunctioning, if modulation parameter set information is incorrect, etc. It should also be noted that the mapping results may present a wrong mapping if the geographical location (or some other criteria) used in the identification operation 202 is incorrect.

Figure 3:
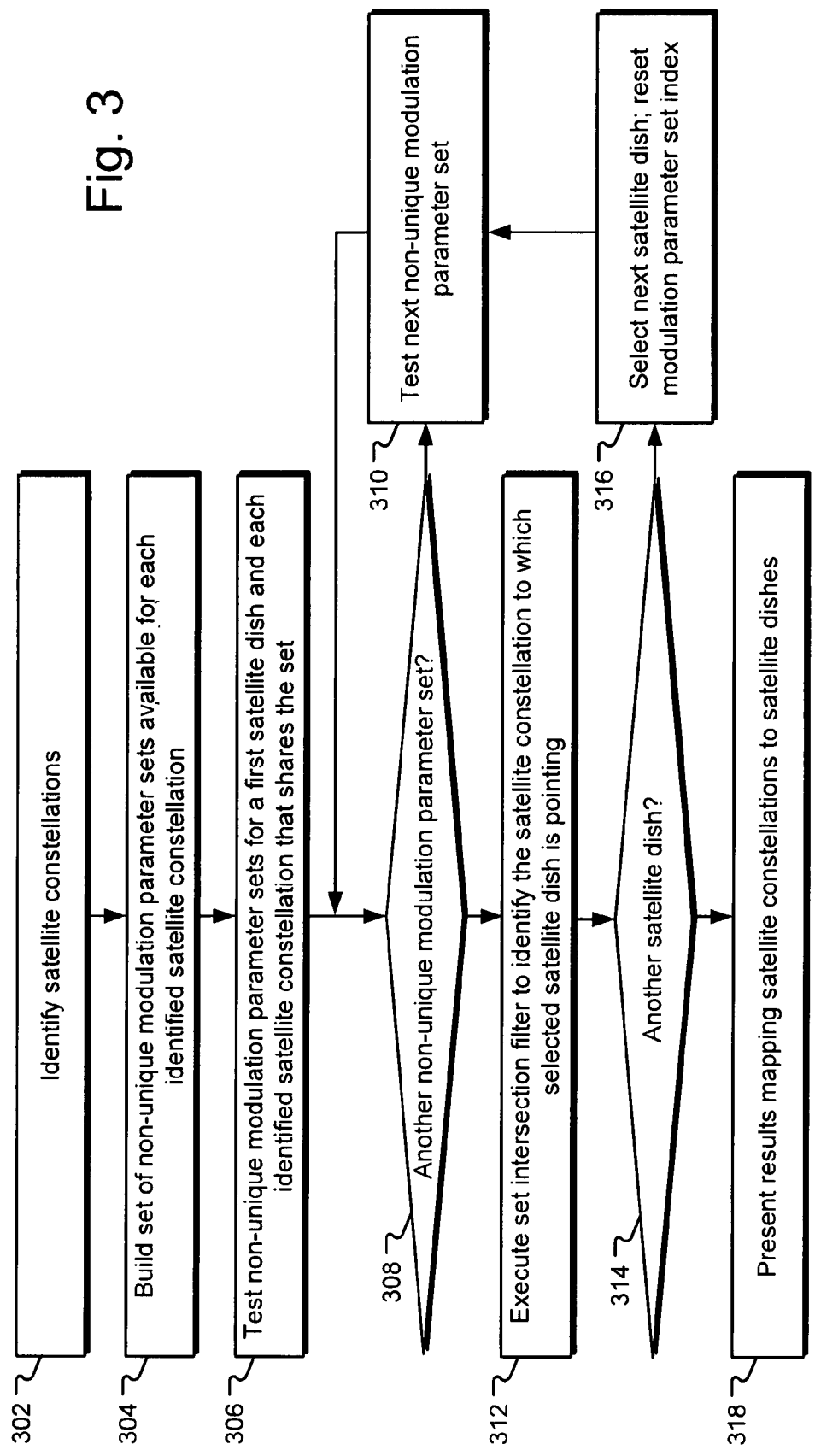
FIG. 3 illustrates additional example operations for detecting a satellite constellation.

FIG. 3 illustrates additional example operations 300 for detecting a satellite constellation. Some satellite constellations share modulation parameter sets with other satellite constellations, which may be reflected in the modulation parameter set datastore accessed by the satellite receiver. These shared modulation parameter sets are designated as "non-unique". In one implementation, the example operations 300 may be executed if at least one satellite dish coupled to the satellite receiver has not yet been mapped using unique modulation parameter sets, although it should be understood that the example operations 300 may be executed in concurrently or in sequence with the example operations 200 of FIG. 2. Alternatively, the example operations 200 of FIG. 2 may be omitted altogether.

An identification operation 302 identifies available satellite constellations and their possible modulation parameters. If the example operations 200 of FIG. 2 or some other previous mapping process have already been executed, the identification operation 302 may optionally omit those satellite constellations that have already been mapped to a satellite dish. In one implementation, the identification operation 302 accesses one or more datastore (local or remote) of known satellite constellations and their possible modulation parameters and narrows these results down according to geographical location and/or other known parameters (e.g., "visible" portion of the sky for each connected satellite dish, payment requirements, etc.). However, the identification operation 302 may alternatively refrain from narrowing these results. Note also that the identification operation 302 may rely on the set of available satellite constellations and their possible modulation parameters identified by identification operation 202 of FIG. 2 or a similar operation.

A building operation 304 builds a set of modulation parameter sets that are not-unique for any satellite constellation. The building operation 304 associates each satellite constellation with its one or more non-modulation parameter sets.

A testing operation 306 selects a connected satellite dish (e.g., via a selector switch connected to multiple satellite dishes), tunes to the first non-unique modulation parameter set associated with a subset of satellite constellation from the set of identified satellite constellations, and determines whether a communications signal from a satellite constellation is received or "locked onto" by the tuner. The results of the testing operation 306 are stored in memory for evaluation against one or more detection criteria, such as a set intersection filter.

A decision operation 308 determines whether another non-unique modulation parameter set is available to the satellite receiver. If so, another testing operation 310 indexes to be next non-unique modulation parameter set and tests it, in a manner similar to the testing operation 306. The combination of decision operation 308 and testing operation 310 iterates through the set of non-unique modulation parameter set. The results of the testing operation 310 are stored in memory for evaluation against one or more detection criteria.

An execution operation 312 executes a filter to implement a detection criteria evaluation on the results of testing operation 306 and 310 in order to identify the satellite constellation toward which the satellite dish is pointing. In one implementation, a set intersection filter may be employed, although other filters may be used, including a statistical best fit filter, a threshold filter, a filter requiring user input, etc. An example detection filter in satellite detection may include frequency, symbol rate, and polarization of the received signal. Other examples may include without limitation any set of out-of-band modulation parameters. In-band filters may alternatively be used, such as searching for a unique identifier, pattern, or combination of data within the in-band data stream that uniquely identifies the transport stream.

Operation of an example set intersection filter is outlined below. Assume four non-unique modulation parameters (e.g., transponder tuner settings $T_1, T_2, T_3$, and $T_4$) are identified for various combinations of available satellite constellations A, B, C, and D, as follows:

$T_1$—is present on satellite constellations A, B, and C
$T_2$—is present on satellite constellations B, C, and D
$T_3$—is present on satellite constellations C, D, and A
$T_4$—is present on satellite constellations D, A, and B Accordingly, the set of modulation parameter sets associated with each of the four satellite constellations are:

A—{T1, T3, T4}
B—{T1, T2, T4}
C—{T1, T2, T3}
D—{T2, T3, T4}

Assume that, when testing operation 306 and/or 310 are executed for a given satellite dish, the following results are achieved:

| Test results | Running Count |
| --- | --- |
| $T_1$ - Lock | A(+1), B(+1), C(+1), D(0) |
| $T_2$ - Lock | A(+1), B(+2), C(+2), D(+1) |
| $T_3$ - Lock | A(+2), B(+2), C(+3), D(+2) |
| $T_4$ - No Lock | A(+1), B(+1), C(+3), D(+1) |

Accordingly, the set of modulation parameters associated with satellite constellation C best satisfies the test results (in this example, exactly matching the test results for all four modulation parameter sets, although an exact match is not required). In one implementation, the set intersection filter may be implemented by incrementing a count for each satellite constellation when a modulation parameter set properly locks and by decrementing the count when a modulation parameter set does not lock onto a satellite signal during the test, as demonstrated in the right column of the test results above that indicate C as the winner because it has the highest count. To use the "set intersection" terminology, the set of non-unique modulation parameter sets for satellite constellation C best matches the set of test results.

A decision operation 314 determine whether another satellite dish may be available for testing, such as via a selector switch. If so, a selector operation 316 selects the next satellite dish or the next connection on the selector switch, and the modulation parameter set index is reset to the first modulation parameter set. Then, processing proceeds to the testing operation 310. If not, then all satellite dishes have been tested against all identified satellite constellations, and a presentation operation 318 presents the results for use by the satellite receiver and/or a user/installer. It should again be noted that the mapping results may present a null mapping for a given satellite dish.

Figure 4:
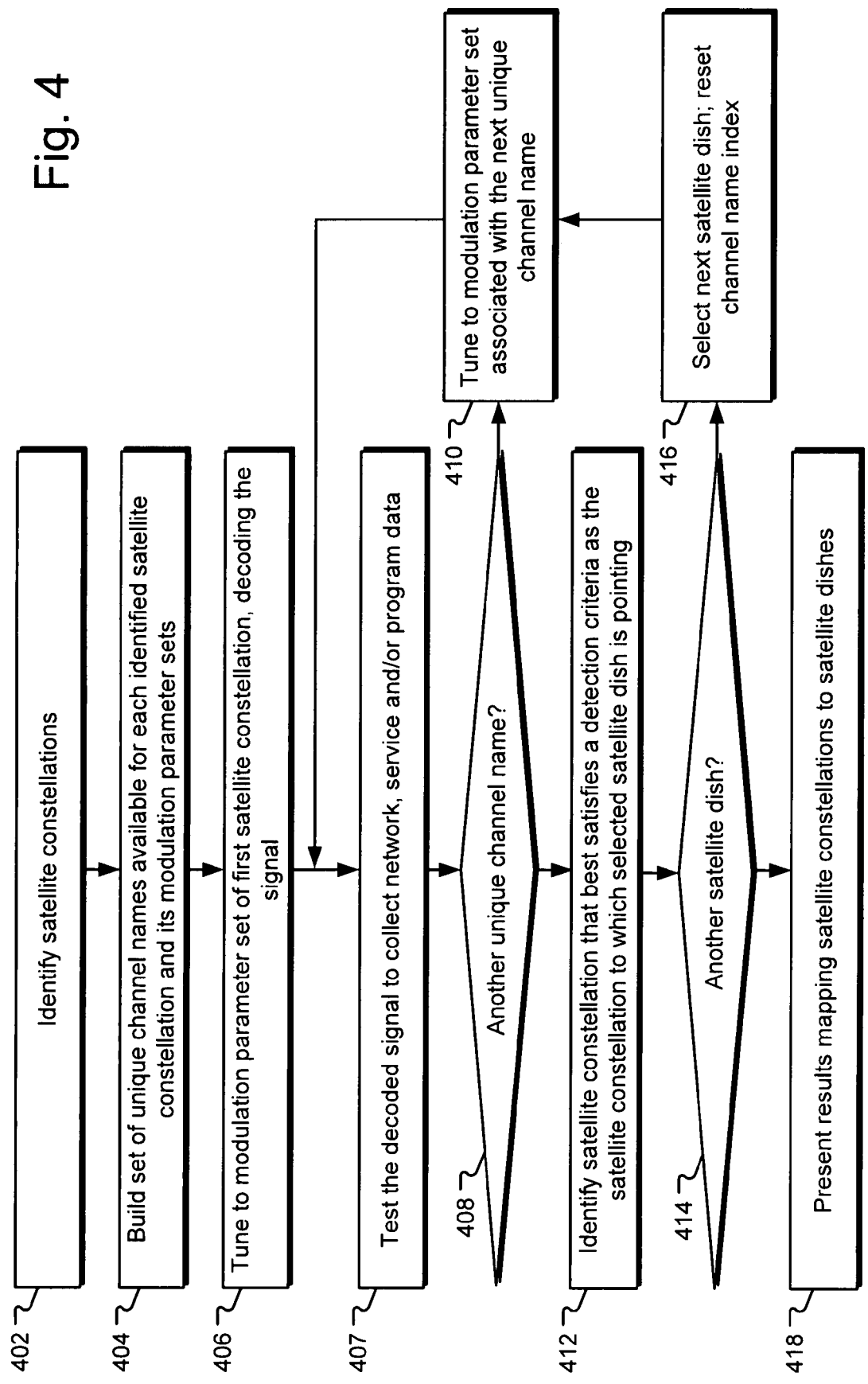
FIG. 4 illustrates additional example operations for detecting a satellite constellation employing channel names as in-band data.

FIG. 4 illustrates additional example operations 400 for detecting a satellite constellation employing channel name as in-band information. In one implementation, the example operations 400 may be executed if at least one satellite dish coupled to the satellite receiver has not yet been mapped using unique modulation parameter sets, although it should be understood that the example operations 400 may be executed in concurrently in sequence with the example operations 200 of FIG. 2 and/or operations 300 of FIG. 3. Alternatively, the example operations 200 of FIG. 2 and/or operations 300 of FIG. 3 may be omitted altogether.

An identification operation 402 identifies available satellite constellations and their possible modulation parameters. In one implementation, the identification operation 402 accesses one or more datastore (local or remote) of known satellite constellations and their possible modulation parameters and narrows these results down according to geographical location and/or other known parameters (e.g., "visible" portion of the sky for each connected satellite dish, payment requirements, etc.). However, the identification operation 402 may alternatively refrain from narrowing these results.

A building operation 404 builds a set of channel names that are unique for any satellite constellation. The building operation 404 associates each satellite constellation and its modulation parameter sets with its one or more unique channel names.

A tuning operation 406 selects a connected satellite dish (e.g., via a selector switch connected to multiple satellite dishes) and attempts to tune to a modulation parameter set of a first satellite constellation and decodes the received signal if a communications signal is received. A testing operation 407 evaluates the network, service, or program data of the decoded communications signal received from a satellite constellation to determine the channel name associated with the signal. The testing operation 407 may also repeat for each modulation parameter set associated with the first satellite constellation, or at least a defined subset of these modulation parameter sets. The results of the testing operation 407 are stored in memory for evaluation against one or more detection criteria.

A decision operation 408 determines whether another unique channel name may be available to the satellite receiver. If so, another tuning operation 410 indexes to the next unique channel name associated with the set of identified satellite constellations, tunes to the associated modulation parameter set, and decodes any received communications signal. Processing then proceeds to a testing operation 407. The combination of decision operation 408, tuning operation 410, and testing operation 407 iterates through the set of unique channel names to collect test results for each satellite constellation and its set of unique modulation parameters. The results of the testing operation 407 are stored in memory for evaluation against one or more detection criteria.

An identification operation 412 evaluates the testing results stored in memory against one or more detection criteria to identify the satellite constellation toward which the satellite dish is pointing. For example, in a "unitary" test, if the channel name extracted from the network, service, and/or program data matches the unique channel name of a satellite constellation, then that satellite constellation is mapped to the current satellite dish. The identification operation 412 may alternatively use other detection criteria including a threshold test, a majority test, or a percentage test. It should be noted that the channel name is not the only in-band type of information that can be used by the described detection process. For example, in DVB-S-only constellations, the set comprising the following in-band parameters may be used: {original_network_id, network_id, transport_stream_id, service_id}, although other sets may also be employed.

A decision operation 414 determine whether another satellite dish may be available for testing, such as via a selector switch. If so, a selector operation 416 selects the next satellite dish or the next connection on the selector switch, and the modulation parameter set index is reset to the first unique channel name of the first satellite constellation. Then, processing proceeds to the tuning operation 410. If not, then all satellite dishes have been tested against all identified satellite constellations, and a presentation operation 418 presents the results for use by the satellite receiver and/or a user/installer. It should be noted that the mapping results may present a null or wrong mapping for a given satellite dish.

Figure 5:
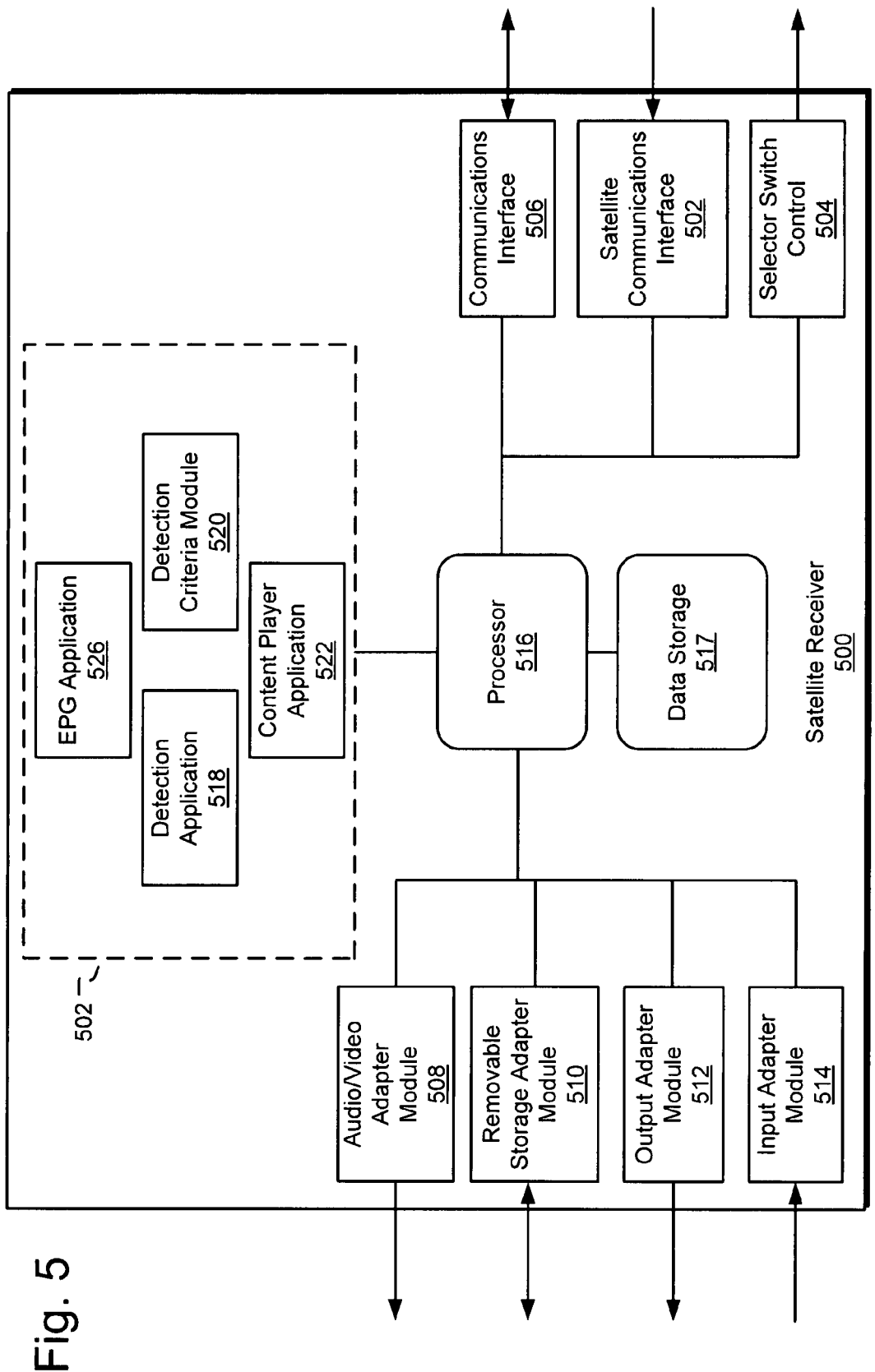
FIG. 5 illustrates components of an example satellite receiver.

FIG. 5 illustrates components of an example satellite receiver 500, which is coupled to one or more satellite dishes by a satellite communications interface 502, which receives communications signals received by the connected satellite dishes. The satellite receiver 500 may also be coupled to a selector switch (e.g., a DiSEqC switch) via a selector switch control 504, which controls the selection of the one or more satellite dishes for communication with the satellite receiver 500 (see e.g., FIG. 1 for an example of such a configuration). In one implementation, the satellite tuner comprises the satellite communications interface 502, although in other implementations, the satellite tuner comprises both the satellite communications interface 502 and the selector switch control 504. Other configurations are also contemplated. The example satellite receiver 500 also includes a communication interface 506, such as a network connector for accessing a network server, Web resources, etc. Updated satellite constellation modulation parameter sets and channel names may, for example, be obtained via the communications interface 506, in some implementations.

An audio/video adapter module 508 couples the satellite receiver 500 to a visual display device, such as a television or computer monitor, and/or to an audio output device (e.g., speakers, headset, etc.) to present satellite communications content, electronic programming guide (EPG) information, and satellite receiver configuration information (e.g., the satellite dish mapping results to satellite constellations). A removable storage adapter module 510 provides access to removable storage media, such as that which may be used to install an operating system and/or various applications on the satellite receiver 500 or to provide to or receive data from the satellite receiver 500. For example, the updated satellite constellation data may be provided to the satellite receiver 500 via a CD-ROM drive and/or satellite television content may be burned from the satellite receiver 500 to an optical disc via a DVD drive. An output adapter module 512 may couple the satellite receiver 500 to one or more output device, such as a printer, a USB device, external storage, etc. An input adapter module 514 may couple to the satellite receiver 500 to one or more input devices, such as a remote control receiver, a keyboard, a pointing device, etc.

A processor 516 couples to all of these modules to control communications of the satellite receiver 500 with other devices. The processor 516 also couples to data storage 517 (e.g., memory, magnetic disc storage, optical disc storage, etc.), which can store application code and data. The processor 516 is also shown as coupled to a set of example application 502. A detection module 518 manages the automated detection of one or more satellite constellations available to the satellite receiver by executing one or more of the processes (or similar processes) described with regard to FIGS. 2, 3, and 4. A detection criteria module 520 (e.g., in cooperation with the detection module 518) implements testing against one or more specified detection criteria, such as those described herein. A content player application 522 decodes incoming signal streams and presents content through the audio/video adapter module 508, the output adapter module 512, the removable storage adapter module 510, or communications interface 506. An EPG application 526 manages and presents an EPG to a user or other process, when requested, based in part on the satellite constellation(s) detected by the satellite receiver 500.

It should be understood that mapping results may be presented via any output interface of a satellite receiver including a display adapter module, an output adapter module, a storage adapter module, a memory controller, a communications interface, or some other system interface capable of communicating with a user or other system.

A high level description of a system that can be used to implement a satellite receiver 500 is discussed with regard to FIG. 5. However, the example hardware and example operating environment of FIG. 6 may also be used for implementing the described technology, which may include a general purpose computing device in the form of a gaming console, set top box, or computer 20, including a processing unit 21, a system memory 22, and a system bus 23 that operatively couples various system components including the system memory to the processing unit 21. There may be only one or there may be more than one primary processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited. In the illustrated example, an auxiliary processor 48 is also coupled to the system bus 23 to provide processing operation for an auxiliary processing state. In an alternative implementation, the primary processing unit 21 provides both a primary processing mode and an auxiliary processing mode.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A primary display device 47, such as a flat panel display or other type of display device, is also connected to the system bus 23 via a display controller, such as a primary display adapter 48 or an auxiliary display adapter 64. In the illustrated example, a multiplexer 66 switches display signals from the individual display controllers. Alternatively, the display controllers can include components to provide a high impedance, such as tri-state buffers, when not signaling the primary display adapter 47. In an alternative implementation, a single display controller may be employed via the primary processing unit 21. In addition to the primary display device 47, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an operating system, an EPG application, a detection application, a detection criteria module, a content player application various adapters and interfaces, and other modules may be embodied by instructions stored in memory 22 and/or storage devices 29 or 31 and processed by the processing unit 21. Test results, modulation parameter sets, channel names, satellite communications content, EPG data, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method for identifying a satellite constellation, the method comprising:
   configuring a satellite receiver to use at least a first modulation parameter set from among a plurality of modulation parameter sets associated with a plurality of known satellite constellations available for communication with the satellite receiver via a satellite dish, wherein each of the plurality of modulation parameter sets comprises a plurality of parameters;
   setting a predefined threshold number as a criterion to evaluate attempts to lock on to a communications signal transmitted by an unidentified satellite constellation and received in the satellite receiver;
   identifying the unidentified satellite constellation by using an automated identification procedure, the automated identification procedure comprising at least one of: a) detecting a number of successful locks reaching the predefined threshold number or b) the number of successful locks being reached using a specified percentage of a total number of unique modulation parameter sets associated with a first satellite constellation; and
   upon identifying the unidentified satellite constellation, presenting a mapping result between at least the identified satellite constellation and the satellite dish, through an output interface.

2. The method of claim 1, wherein the first modulation parameter set includes a signal frequency value, a signal symbol rate, and a signal polarization value.

3. The method of claim 2, wherein the first modulation parameter set includes a tolerance for at least one of the values of the first modulation parameter set.

4. The method of claim 1, wherein the automated identification procedure further comprises at least one decoding-independent detection criterion that is independent of decoding the received communications signal and is independent of content of the received communications signal.

5. The method of claim 1, wherein the satellite dish is coupled to the satellite receiver through a selector switch and further comprising:
   selecting another satellite dish coupled to the satellite receiver through a selector switch;
   after the selecting, configuring the satellite receiver to receive another communications signal through the other satellite dish aimed at another satellite constellation using a second modulation parameter set from among the plurality of modulation parameter sets;
   after the successful receiving, identifying the other satellite constellation as a different specified one of the plurality of known satellite constellations; and
   after the identifying, presenting a mapping result between the different specified one of the plurality of known satellite constellations and the other satellite dish through the output interface.

6. The method of claim 1, wherein the presenting comprises:
   displaying the mapping result on a visual display device.

7. The method of claim 1, wherein the automated identification procedure determines whether the first modulation parameter set best matches a defined set of non-unique modulation parameter sets associated with the plurality of known satellite constellations.

8. The method of claim 1, further comprising:
   decoding the received communications signal;
   extracting channel-specific information from the decoded communications signal; and
   identifying the satellite constellation as a specified one of the plurality of known satellite constellations when the extracted channel-specific information matches unique channel-specific information.

9. A computer-readable storage device containing computer-executable instructions for executing a computer process on a computing system, the computer executable instructions comprising instructions that cause a processor to:
   configure a satellite receiver to use at least a first modulation parameter set from among a plurality of modulation parameter sets associated with a plurality of known satellite constellations available for communication with the satellite receiver via a satellite dish;
   set a predefined threshold number as a criterion to evaluate attempts to lock on to a communications signal transmitted by an unidentified satellite constellation and received in the satellite receiver;
   use an automated identification procedure to identify the unidentified satellite constellation as a specified one of the plurality of known satellite constellations, the automated identification procedure comprising at least one of: a) detection of a number of successful locking attempts reaching the predefined threshold number or b) the number of successful locks being reached using a specified percentage of a total number of unique modulation parameter sets associated with a first satellite constellation; and
   after the identify, present a mapping result between the specified one of the plurality of known satellite constellations and the satellite dish through an output interface.

10. The computer-readable storage device of claim 9, wherein the first modulation parameter set includes a signal frequency value, a signal symbol rate, and a signal polarization value.

11. The computer-readable storage device of claim 9, wherein each of the modulation parameter sets is not unique to the specified one of the plurality of known satellite constellations and the automated identification procedure determines whether the first modulation parameter set best matches a defined set of non-unique modulation parameter sets associated with the specified one of the plurality of known satellite constellations available for reception by the satellite receiver via the satellite dish.

12. The computer-readable storage device of claim 9, wherein the computer-executable instructions further comprise instructions that cause a processor to:
decode the received communications signal;
extract channel-specific information from the decoded communications signal; and
identify the satellite constellation as the first constellation when the extracted channel-specific information matches unique channel-specific information.

13. A satellite receiver adapted for communicating with one or more satellite dishes, the satellite receiver comprising:
a processor executing a detection application that configures the satellite receiver using a plurality of modulation parameter sets to receive a communications signal through one of the satellite dishes, the satellite dish being aimed at a satellite constellation, each modulation parameter set being associated with at least one known satellite constellation from a plurality of known satellite constellations available for communication with the satellite receiver via the satellite dish;
a satellite communications interface that, after the executing, successfully receives the communications signal from the satellite constellation when the satellite receiver is configured in accordance with each element of a tunable subset of the plurality of modulation parameter sets, the processor activating a detection criteria module that identifies the satellite constellation as a specified one of the plurality of known satellite constellations when the tunable subset of modulation parameter sets satisfies a decoding-independent detection criterion for the specified one of the plurality of known satellite constellations, the decoding-independent detection criterion comprising at least one of: a) detecting a number of successful locks reaching a predefined threshold number that is used as a criterion to evaluate lock attempts or b) the number of successful locks being reached using a specified percentage of a total number of unique modulation parameter sets associated with the satellite constellation; and
an output interface that, after the successful receiving, presents a mapping result between the specified one of the plurality of known satellite constellations and the satellite dish.

14. The satellite receiver of claim 13, wherein the modulation parameter set includes a signal frequency value, a signal symbol rate, and a signal polarization value.

15. The satellite receiver of claim 13, wherein the detection criterion determines whether the tunable subset of modulation parameter sets best matches a defined set of non-unique modulation parameter sets associated with the specified one of the plurality of known satellite constellations available for reception by the satellite receiver via the satellite dish.

16. The satellite receiver of claim 13, wherein the processor further executes a content player application that decodes the received communications signal, extracts channel-specific information from the decoded communications signal, and identifies the satellite constellation as a specified one of the plurality of known satellite constellations when the extracted channel-specific information matches unique channel-specific information associated with the specified one of the plurality of known satellite constellations.

* * * * *